Figure 1:
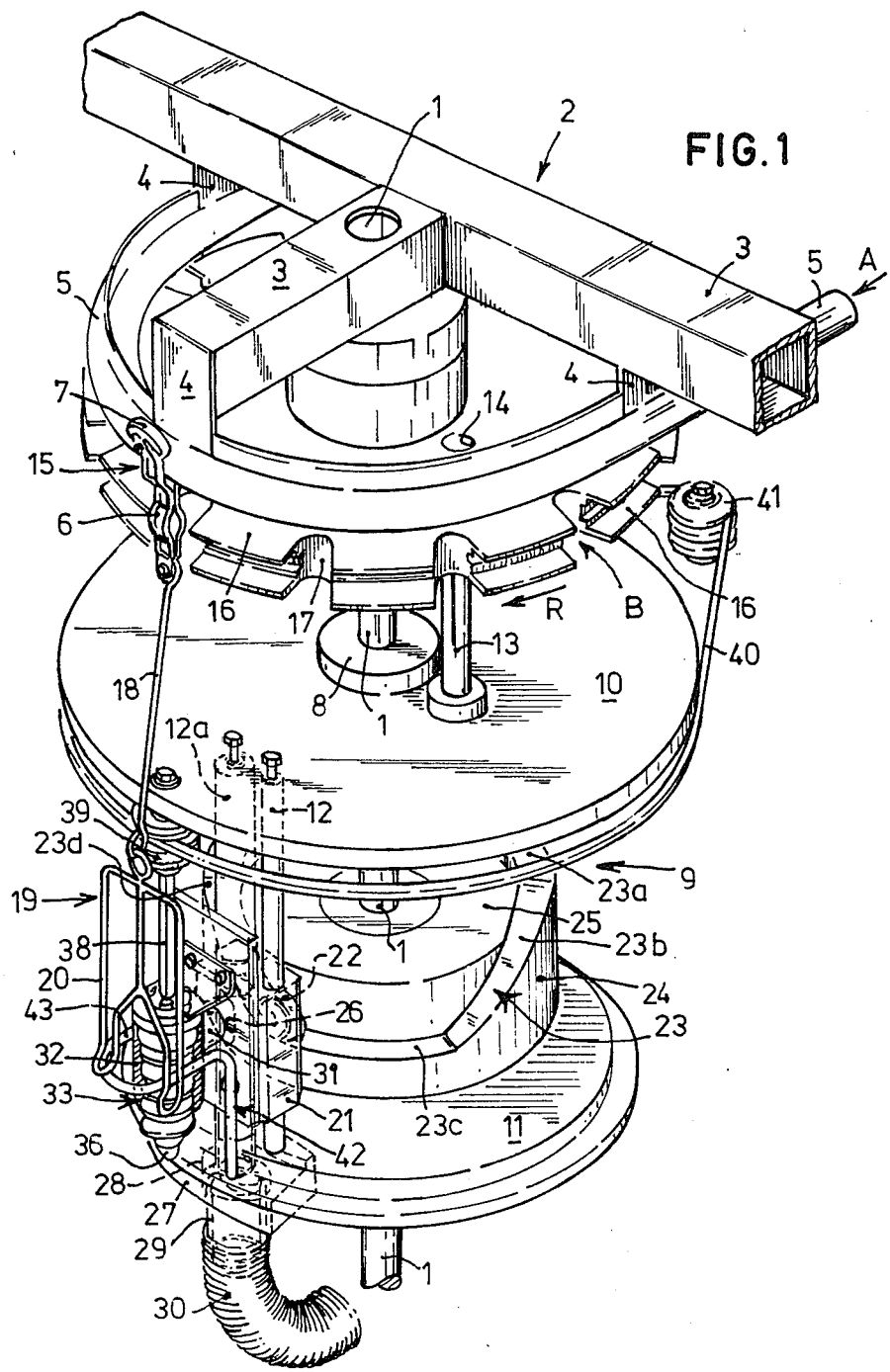

United States Patent [19]
Tieleman

[11] Patent Number: 4,776,063
[45] Date of Patent: Oct. 11, 1988

[54] METHOD AND APPARATUS FOR REMOVING FAT FROM SLAUGHTERED POULTRY

[75] Inventor: Rudolf J. Tieleman, Doesburg, Netherlands

[73] Assignee: Linco Holland Engineering B.V., Doesburg, Netherlands

[21] Appl. No.: 88,355

[22] Filed: Aug. 24, 1987

[30] Foreign Application Priority Data

Sep. 2, 1986 [EP] European Pat. Off. ........ 86201504.7

[51] Int. Cl.$^4$ ............................................... A22C 21/00
[52] U.S. Cl. ............................................... 17/45; 17/11
[58] Field of Search ....................................... 17/11, 58

[56] References Cited

U.S. PATENT DOCUMENTS

| | | | |
|---|---|---|---|
| 3,705,440 | 12/1972 | Lewis | 17/11 |
| 3,958,303 | 5/1976 | Scheier et al. | 17/11 X |
| 4,117,570 | 10/1978 | Meyn | 17/11 |
| 4,270,242 | 6/1981 | Loth et al. | 17/11 |

FOREIGN PATENT DOCUMENTS 0204366 12/1986 European Pat. Off.

Primary Examiner—Willie G. Abercrombie
Attorney, Agent, or Firm—Beveridge, DeGrandi & Weilacher

[57] ABSTRACT

Device for removing fat from slaughtered poultry, provided with a screw spindle drivable around its longitudinal axis, said spindle being rotatably mounted in a cylindrical sleeve surrounding at least a part of the screw thread on the spindle with a radial clearance. Machine with devices for removing fat from slaughtered poultry mounted in the shape of a roundabout.

24 Claims, 2 Drawing Sheets

METHOD AND APPARATUS FOR REMOVING FAT FROM SLAUGHTERED POULTRY

The invention relates to a device for removing fat from slaughtered poultry.

Up till now the removal of fat from slaughtered poultry is still done manually, for which average two attendants are needed, who each have to deal with about 1500 birds per hour. This is not only a monotonous job, but it also constitutes a heavy bodily burden, since the attendants only use a few muscles, what relatively quickly and frequently leads to complaints. Furthermore especially a less skilled person can easily damage the interior of the slaughtered bird with his knife, scraper or other auxiliary means.

According to the invention there is now proposed a device for removing fat from slaughtered poultry, characterized in that the device is provided with a screw spindle drivable around its longitudinal axis, said spindle being rotatably mounted in a cylindrical sleeve concentrically surrounding at least a part of the screw thread on the spindle with a radial clearance.

By applying the drivable screw spindle in the concentrical sleeve the fat can be drawn from the slaughtered bird and fed into the radial clearance between the sleeve and the spindle, from which it can be easily removed in variable ways. The device of the invention facilitates the removal of fat from slaughtered poultry considerably and in addition the removal of fat can be carried out more rapidly.

According to the invention the screw spindle preferably has a tapering infeed part, facilitating the introduction of the screw spindle into the slaughtered bird, especially when this is done mechanically.

In a special, efficient emoodiment of the device according to the invention the tapering infeed part of the screw spindle is spherical at its free end. Owing thereto damage of the interior of the slaughtered bird is avoided as much as possible.

The invention will be elucidated in detail along the lines of the drawing with an embodiment.

Figure 2:
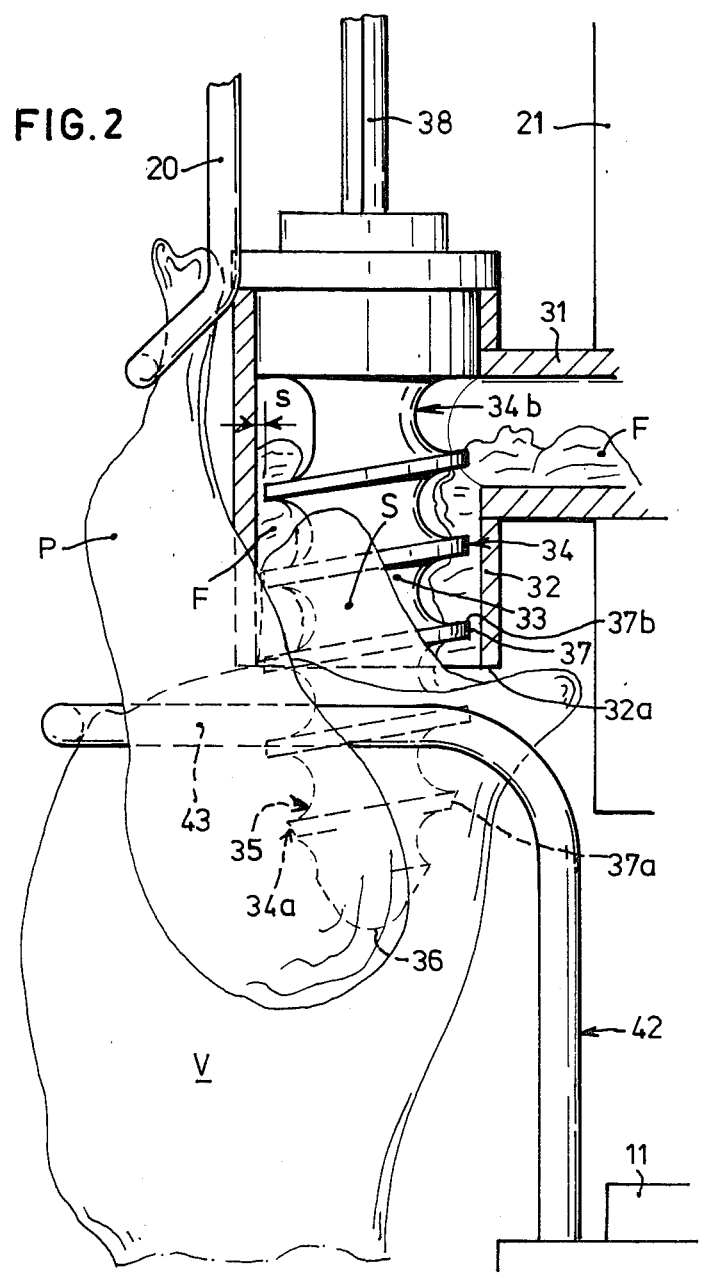

FIG. 1 is a perspective view of a machine, wherein the device according to the invention can be applied, and FIG. 2 is a side view of the device according to the invention in the active position.

The machine which is drawn in FIG. 1, is provided with a central, stationary shaft 1 which is vertically adjustable, for example by means of a crank, a gearing and a toothed rack (not shown), mounted in a frame 2 (only partially shown), said frame consisting of hollow box girders (3). By means of strips 4 a rail 5 is suspended from the hollow box girders 3, said rail being part of a production line, along which several machines for processing slaughtered birds are disposed (not shown) and in which over the rail 5 carriers 6 are movable which are interconnected by a chain (not shown), constituting the production line. The carriers 6 are movable over the rail 5 by means of rollers 7 at the inner side and the outer side.

By means of bearings 8 a cage 9 is rotatably mounted on the central shaft 1, said cage consisting of a top plate 10 and a bottom plate 11 interconnected by means of several, for example twelve peripherally spaced pairs of guide rods 12 and 12a. On the top plate 10 a carrying pin 13 is fixed engaging a bore 14 in a sprocket wheel 15 driven by the aforementioned chain in the direction of rotation R. In the bore 14 a slide bearing (not shown) for the carrying pin 13 may optionally be mounted. The sprocket wheel 15 has teeth 16 and teeth cavities 17, the pitch of which corresponds to that of the carriers 6 on the chain (not shown). So the sprocket wheel 15 and therewith the cage 9 is driven around the central, stationary shaft 1 by the production line chain.

A connecting rod 18 is pivotally suspended at each carrier 6, and at the bottom end of said rod a U-shaped leg hook 19 is suspended, the legs 20 of which are carried out double, said legs also being bent in U-shape at their free ends and said legs 20 at their free ends being bent slightly outwardly with respect to the machine, in such a manner that a slaughtered bird can be securely suspended with its ankle joints in the U-shaped legs 20 of the leg hook 19. On the guide rods 12, 12a a slide 21 is mounted which is slidable upwardly and downwardly. On the slide 21 a follower roller 22 is mounted on the side turned towards the central shaft 1 and cooperates with a curved track 23, said curved track 23 being formed on a cylindrical element 24, for example of nylon, said element being fixedly mounted on a drum 25, said drum in its turn being fixedly mounted on the central shaft 1. The curved track 23, seen in the direction of rotation R of the sprocket wheel 15 and the cage 9, consists of a horizontal, uppermost flat part 23a, a downwardly inclining part 23b, a horizontal lowermost flat part 23c and an upwardly inclining part 23d. The function thereof will be elucidated hereinafter. The cylindrical element 24 may be mounted adjustably in height direction and in peripheral direction on the drum 25.

The guide rod 12a is carried out hollow over at least a part of its length and is at the level of the slide 21 provided with an opening 26 in its wall, while the lower end of the guide rod 12a, approximately till the upper end of the opening 26 is carried out as a tube mounted in the bottom plate 11 and opening at the underside thereof.

Approximately in the angular position of the guide rods 12 and 12a in FIG. 1 a distribution head 27 is mounted below the bottom plate 11 of the cage 9, said head being secured to the central shaft 1. The distribution head 27 is provided with a circularly bent, continuous longitudinal hole 28, to which in the position of the cage 9 as shown in FIG. 1 the tubular end portion of the guide rod 12a is connected at the upper side of said hole 28, and said hole 28 at the lower side thereof is connected to a tube stub 29 secured to the distribution head 27, said tue stub 29 is connected to a vacuum source (not shown) by means of a corrugated tube 30.

On the outer side of the slide 21 a short tubular piece 31 is mounted (vide also FIG. 2) connecting in the position of the slide 21 shown in FIG. 1 through the opening 26, the hollow guide rod 12a, the longitudinal hole 28, the tube stub 29 and the tube 30 to the vacuum source. On the free end of the short tube 31, parallel to the guide rods 12, 12a, a cylindrical sleeve 32 is mounted, in which a screw spindle 33 drivable around its longitudinal axis, is rotatably mounted, the screw thread 34 of which is at least partially concentrically surrounded by the cylindrical sleeve 32, which has a radial clearance (s) with respect to the outer periphery of the screw thread 34. The radial clearance (s) between the outer periphery of the screw thread 34 on the screw spindle 33 and the inner wall of the cylindrical sleeve 32 is usually about two to four mm. The screw spindle 33 has a tapering infeed part 35 which has a spherical free end 36. The major part of the length of the screw thread 34 is limited at its outer periphery by a cylindrical plane 37 that is concentrical with respect to the axis of the screw spindle 33. The screw thread 34a on the tapering infeed part 35 of the screw spindle 33 is limited at its outer periphery by a conical plane 37a that is concentrical with respect to the axis of the screw spindle 33. The screw thread 34 at the end of the screw spindle 33 turned away from the free end 36, terminates in a pitchless discharge groove 34b, whereby a pin protruding into the discharge groove 34b may be applied at the inner wall of the cylindrical sleeve 32 adjacent to the connection to the suction device 12a, 28, 29, 30. The function and operation of the cylindrical sleeve 32 and of the screw spindle 33 will hereafter be elucidated in detail.

The screw spindle 33 which is shaped hollow is drivably connected to and mounted axially slidable on a square drive shaft 38 which at its upper end is axially secured to and rotatably mounted with respect to the top plate 10. On the square drive shaft 38 a drive pulley 39 is mounted which is carried out as a V-belt pulley and which is drivable by means of a V-belt 40 passed over a V-belt pulley 41 mounted on a motor shaft (not shown). The motor (not shown) can be mounted adjustably on the machine frame 2 to tension the V-belt 40.

Finally at the level of the slide 21 at the outer side of the bottom plate 11 a U-shaped leg clip 42 is secured, which has at its upper end a part 43 bent at right angles, said part having the object to spread the legs P of the slaughtered bird V during the operation of the device, which will be elucidated hereafter in detail.

The operation of the above described device is as follows:

The slaughtered birds V hang, or are being suspended with their ankle joints in the outwardly bend ends of the legs 20 of the leg hooks 19 and the carriers 6 of the conveyor belt travel at A on the rail 5. The follower roller 22 of the slide 21 travels on the uppermost flat part 23a of the curved track 23.

Approximately at point B the carriers 6 are engaging the teeth cavities 17 and the leg clips 42 with the horizontally bent part 43 engage between the legs P of the slaughtered birds V and spread the legs. Subsequently the carriers 6 rotate the sprocket wheel 15 and the cage 9 together with the slides 21, and the follower roller 22 moves on the downwardly inclining part 23b of the curved track 23, so that the screw spindle 33 with the infeed part 35 and the spherical free end 36 moves downwardly into the cut open bottom of the bird V. The rolling movement of the follower roller 22 on the downwardly inclining part 23b of the curved track 23 and thus the downward movement of the screw spindle 33 continues for such a period until the lower edge 32a of the sleeve 32 around the screw spindle 33 will rest on the bottom of the bird V, after which the downward movement of the slide 21 stops. In this manner the abutment in vertical direction is obtained for the slide 21 with the screw spindle 33 and the sleeve 32. The follower roller 22 is then preferably at some distance above the lowermost flat part 23c of the curved track 23, so that with a slaughtered bird V having longer legs P the slide 21 and thus the screw spindle 33 together with the sleeve 32 may move further downwardly. The position in height direction of the curved track 23 with respect to the slaughtered bird V is adjustable by means of the above described adjustment device for the stationary central shaft 1. The downward movement of the screw spindle 33 driven by the driving device 41-38, into the bottom of the bird V, is facilitated by the spherical free end 36 and the conically tapering infeed part 35 of the screw spindle 33, the infeed part 35 already loosening part of the fat and carrying this upwardly on the screw spindle 33. Simultaneously the spherical free end 36 and the tapering infeed part 35 provide for as little damage as possible of the tissues of the bird V.

During the movement of the follower roller 22 above the lowermost flat part 23c of the curved track 23, the screw spindle 33 is screwing the fat F upwardly out of the slaughtered bird V, at least a part of the skin S at the bottom of the bird being pulled upwardly into the clearance (s) between the screwspindle 33 and the sleeve 32. In doing so, this skin S which has the major part of the fat attached to it, is as it were, scraped off by the screw thread 34 of the screw spindle 33 which is limited by the cylindrical plane 37, so that a relatively sharp edge 37b is formed on the screw thread.

In the above described manner practically all the unwanted fat F may be removed from the bird V, said fat F accumulating in the uppermost pitchless discharge groove 34b and in the horizontal tube piece 31. If present, the pin (not shown) mounted on the inner wall of the sleeve 32 and extending into the pitchless discharge groove 34b may promote the removal of the fat F from the screw thread 34, but in most cases such a pin is not needed. During the downward movement of the slide 21 on the guide rods 12 and 12a the horizontal tube piece 31 is connected to the opening 26 in the hollow guide rod 12a and as soon as the lower end of the hollow guide rod 12a reaches the opening 28 in the vacuum distribution head 27, the fat F is sucked by the vacuum from the tube piece 31 and from the pitchless discharge groove 34b into the hollow guide rod 12a, and is discharged through the opening 28, through the tube stub 29 and through the corrugated tube 30.

The sucking operation of the vacuum is continued, until said hollow guide rod 12a in the direction of rotation R has completely passed the opening 28 in the vacuum distribution head 27, after which the follower roller 22 travels on the upwardly inclining part 23d of the curved track 23 and the slide 21 with the screw spindle 33 is moved upwardly out of the bird V. After the slide 21 has reached its uppermost position, the follower roller 22 moves on the uppermost flat part 23a of the curved track, where the screw spindle 33 is moved upwardly completely out of the bird V, and the bird V may be detached from the suspension hook 19, or optionally the bird may be fed to a following processing device with the production line and the carriers.

The device for removing fat from slaughtered poultry need not be per se a part of a circular series of identical devices arranged as a roundabout, as described in the foregoing, but the device may also be applied for example as a hand drilling machine in a drill stand, the movement of the screw spindle 33 with the sleeve 32 surrounding the spindle being effected by a lever with a transmission mechanism.

I claim:

1. A device for removing fat from the internal surface of the skin of slaughtered birds which have open bottoms, said device comprising:
    a cylindrical sleeve which has an inner wall and a noncutting free end for contacting the external surface of the skin around the open bottom of a bird, a screw spindle which is driven about its longitudinal axis, at least a portion of said screw spindle being in said cylindrical sleeve and arranged to provide a radial skin-receiving clearance between the sleeve and the spindle, screw thread means on said spindle for scraping the fat off the internal surface of the skin in said skin-receiving clearance, said screw thread means having an outer periphery which is spaced from the inner wall of the sleeve so that said clearance is between said outer periphery of the screw thread means and the inner wall of the sleeve.

2. A device according to claim 1, wherein the screw spindle has a tapering infeed portion.

3. A device according to claim 2, wherein the tapering infeed portion has a free end which is spherical.

4. A device according to claim 1, wherein the radial skin-receiving clearance is about 2 to 4 mm.

5. A device according to claim 1, wherein the screw thread means along a major part of the length of the screw spindle has an outer periphery which lies in a cylindrical plane that is concentric with respect to the screw spindle.

6. A device according to claim 1, wherein the screw thread means has a tapering infeed portion which has an outer periphery lying within a conical plane that is concentric with respect to the screw spindle.

7. A device according to claim 1, wherein the cylindrical sleeve has an outlet end, said device having a suction device connected to said outlet end of the cylindrical sleeve.

8. A device according to claim 7, wherein the screw thread means has an outlet end provided with a pitchless discharge groove.

9. A device according to claim 1, including means for moving the cylindrical sleeve vertically into contact with a bird.

10. A device according to claim 1, including means for moving the screw spindle vertically into the open bottom of a bird.

11. A machine for removing fat from the skin of slaughtered birds which have opened bottoms, said machine comprising a cage which is rotatable about a central shaft, a plurality of fat removing devices mounted on said cage in the form of a roundabout, each of said fat removing devices including the following:

a cylindrical sleeve which has an inner wall and a noncutting free end for contacting the external surface of the skin around the open bottom of a bird, a screw spindle which is driven about its longitudinal axis, at least a portion of said screw spindle being in said cylindrical sleeve and arranged to provide a radial skin-receiving clearance between the sleeve and the spindle, screw thread means on said spindle for scraping the fat off the internal surface of the skin in said skin-receiving clearance, said screw thread means having an outer periphery which is spaced from the inner wall of the sleeve so that said clearance is between said outer periphery of the screw thread means and the inner wall of the sleeve.

12. A machine according to claim 11, wherein the screw spindle has a tapering infeed portion.

13. A machine according to claim 12, wherein the tapering infeed portion has a free end which is spherical.

14. A machine according to claim 11, wherein the radial skin-receiving clearance is about 2 to 4 mm.

15. A machine according to claim 11, wherein the screw thread means along a major part of the length of the screw spindle has an outer periphery which lies in a cylindrical plane that is concentric with respect to the screw spindle.

16. A machine according to claim 11, wherein the screw thread means has a tapering infeed portion which has an outer periphery lying within a conical plane that is concentric with respect to the screw spindle.

17. A machine according to claim 11, wherein the cylindrical sleeve has an outlet end, said machine being having a suction device connected to said outlet end of the cylindrical sleeve.

18. A machine according to claim 17, wherein the screw thread means has an outlet end provided with a pitchless discharge groove.

19. A machine according to claim 11, including means for moving the cylindrical sleeve vertically into contact with a bird.

20. A machine according to claim 11, including means for moving the screw spindle vertically into the open bottom of a bird.

21. A method from removing fat from the skin of slaughtered birds which have opened bottoms, said method including the following steps:

contacting a bird's skin around its open bottom with a cylindrical sleeve which has an inner wall and a noncutting free end, driving a screw spindle about its longitudinal axis while at least a portion of said screw spindle is in said cylindrical sleeve and is arranged to provide a radial skin-receiving clearance between the sleeve and the spindle, scraping the fat off the skin in said skin-receiving clearance with screw thread means on said spindle, said screw thread means having an outer periphery which is spaced from the inner wall of the sleeve so that said clearance is between said outer periphery of the screw thread means and the inner wall of the sleeve.

22. A method according to claim 21, wherein the screw spindle has a tapering infeed part, said method including the step of inserting said tapering infeed part into the opened bottom of a bird before the skin enters said clearance.

23. A method according to claim 21, including the step of moving the cylindrical sleeve vertically into contact with a bird.

24. A method according to claim 21, including the step of moving the screw spindle vertically into the open bottom of a bird.

* * * * *